US009676660B2

(12) United States Patent
Kaneuchi et al.

(10) Patent No.: US 9,676,660 B2
(45) Date of Patent: Jun. 13, 2017

(54) METHOD FOR MANUFACTURING BENT OPTICAL FIBER

(71) Applicant: SUMITOMO ELECTRIC INDUSTRIES, LTD., Osaka-shi, Osaka (JP)

(72) Inventors: Yasuomi Kaneuchi, Yokohama (JP); Yuuichi Mitose, Yokohama (JP); Takashi Sasaki, Yokohama (JP); Tetsuya Nakanishi, Yokohama (JP); Tetsuya Hayashi, Yokohama (JP); Masayuki Kato, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 14 days.

(21) Appl. No.: 14/714,527

(22) Filed: May 18, 2015

(65) Prior Publication Data
US 2015/0336842 A1 Nov. 26, 2015

(30) Foreign Application Priority Data

May 20, 2014 (JP) ................. 2014-103950

(51) Int. Cl.
*C03B 37/15* (2006.01)
*G02B 6/02* (2006.01)

(52) U.S. Cl.
CPC .............. *C03B 37/15* (2013.01); *G02B 6/02* (2013.01)

(58) Field of Classification Search
CPC ...... C03B 37/15; C03B 2203/02; G02B 6/287
See application file for complete search history.

(56) References Cited

U.S. PATENT DOCUMENTS

| 4,229,876 | A | * | 10/1980 | Doty | ...................... C03B 37/16 225/101 |
| 6,003,340 | A | * | 12/1999 | Borak | ..................... C03B 37/15 264/1.24 |
| 2008/0285927 | A1 | * | 11/2008 | Khan | ................ C03B 37/01446 385/123 |
| 2011/0198765 | A1 | | 8/2011 | Sasaki | |
| 2014/0238080 | A1 | * | 8/2014 | Gruner-Nielsen | ....... G02B 6/14 65/384 |

FOREIGN PATENT DOCUMENTS

JP 2004-325622 A 11/2004
JP 5226797 B2 7/2013

OTHER PUBLICATIONS

Machine translation of JP 2004-325622A. Original publication Nov. 18, 2004.*

* cited by examiner

*Primary Examiner* — Cynthia Szewczyk
(74) *Attorney, Agent, or Firm* — Drinker Biddle & Reath LLP

(57) ABSTRACT

An embodiment of the invention relates to a bent optical fiber manufacturing method for manufacturing a bent optical fiber in which a bent region with a desired radius of curvature is formed, while maintaining an optical transmission loss within a permissible range. The method has a pre-step of preparing an optical fiber comprised of silica-based glass, a bend portion forming step of forming a bend portion in a partial region of the optical fiber, and a laser light irradiating step of irradiating the thus-formed bend portion with laser light.

6 Claims, 13 Drawing Sheets

Fig. 11

| | LASER IRRADIATION COUNT | AVERAGE OUTPUT | IRRADIATION TIME PER IRRADIATION | LINEAR LASER WIDTH | ROTATION ANGLE PER ROTATION | OPTICAL LOSS (AT 1.48 μm) |
|---|---|---|---|---|---|---|
| PROCESSING CONDITION 1 | 8 | 30W | 1 sec | 2mm | 10° (FOR 7 ROTATIONS) 12° (FOR LAST ONE ROTATION ONLY) | 5.354dB |
| PROCESSING CONDITION 2 | 41 | 30W | 1 sec | 2mm | 2° | 0.630dB |
| PROCESSING CONDITION 3 | 41 | 20W | 1 sec | 1mm | 2° | 0.242dB | ions is also required to be packed in a reduced profile
METHOD FOR MANUFACTURING BENT OPTICAL FIBER

BACKGROUND OF THE INVENTION

Field of the Invention

The present invention relates to a bent optical fiber manufacturing method for manufacturing a bent optical fiber to be obtained by bending a part of an optical fiber comprised of silica-based glass.

Related Background Art

In conjunction with high-density packaging of electronic components, an optical fiber used near the electronic components is also required to be packed in a reduced profile (i.e., an optical fiber with one end vertically connected to an electronic substrate or the like is required to have a reduced height from the substrate). For achieving reduction in profile of the optical fiber, it is necessary to form a bend portion in the optical fiber.

Japanese Patent Application Laid-open Publication No. 2004-325622 (Patent Literature 1) discloses the invention of an optical fiber component which consists of an optical component body and an optical fiber and in which the optical fiber is obliquely attached at a certain angle (preferably 10° or more) to a central line of the optical component body. This Patent Literature 1 describes the following contents: a sharp bend can be made in the optical fiber in connection with the oblique attachment of the optical fiber to the central line of the optical component body; there is a problem that the sharp bend causes significant strain in the optical fiber, so as to degrade mechanical reliability of the optical fiber; the strain is removed by heating the sharp bend, in order to ensure the mechanical reliability of the optical fiber. This Patent Literature 1 also describes applicability of discharge, carbon dioxide laser, a gas burner, or the like as heating means for eliminating the strain.

Japanese Patent No. 5226797 (Patent Literature 2) discloses the invention of bending the optical fiber by continuously heating a fixed range of the optical fiber with a non-contact heating means while moving the non-contact heating means relative to the optical fiber. This Patent Literature 2 also describes preferred use of arc discharge as the non-contact heating means.

SUMMARY OF THE INVENTION

The Inventors conducted research on the conventional bent optical fiber manufacturing methods and found the problem as described below. Specifically, for achieving further reduction of the profile of the optical fiber, it is necessary to make the radius of curvature smaller in the bent region formed in the optical fiber. As the radius of curvature of the bent region is made smaller, the optical transmission loss of the optical fiber becomes more prone to increase. Therefore, it is desirable to make the radius of curvature of the bent region as small as possible, while keeping the optical transmission loss of the optical fiber lower than a permissible upper limit.

However, according to the Inventors' knowledge, when the bent region with the radius of curvature of about several millimeters (including one bend portion or more bend portions) is attempted to be formed in the optical fiber, a bend with an unintendedly small radius of curvature may be generated therein and it can result in making the optical transmission loss of the optical fiber larger than the permissible upper limit.

The present invention has been accomplished in order to solve the problem as described above, and it is an object of the present invention to provide a bent optical fiber manufacturing method for manufacturing a bent optical fiber in which a bent region with a desired radius of curvature is formed, while keeping the optical transmission loss within a permissible range.

A bent optical fiber manufacturing method according to an embodiment of the invention is a method for manufacturing a bent optical fiber in which a bend portion is formed at least in a part thereof. Specifically, the method comprises: a pre-step of preparing an optical fiber comprised of silica-based glass; a bend portion forming step of bending a partial region of the prepared optical fiber, thereby to form a bend portion in the optical fiber; and a laser light irradiating step of heating the bend portion by irradiation with laser light to soften the bend portion formed in the bend portion forming step, thereby to relax a bend in the bend portion.

BRIEF DESCRIPTION OF THE DRAWINGS

FIG. 11 is a table collectively showing various conditions in respective processing conditions 1 to 3 for manufacture of bent optical fibers and optical transmission losses.

DETAILED DESCRIPTION OF EMBODIMENTS

Figure 1A:
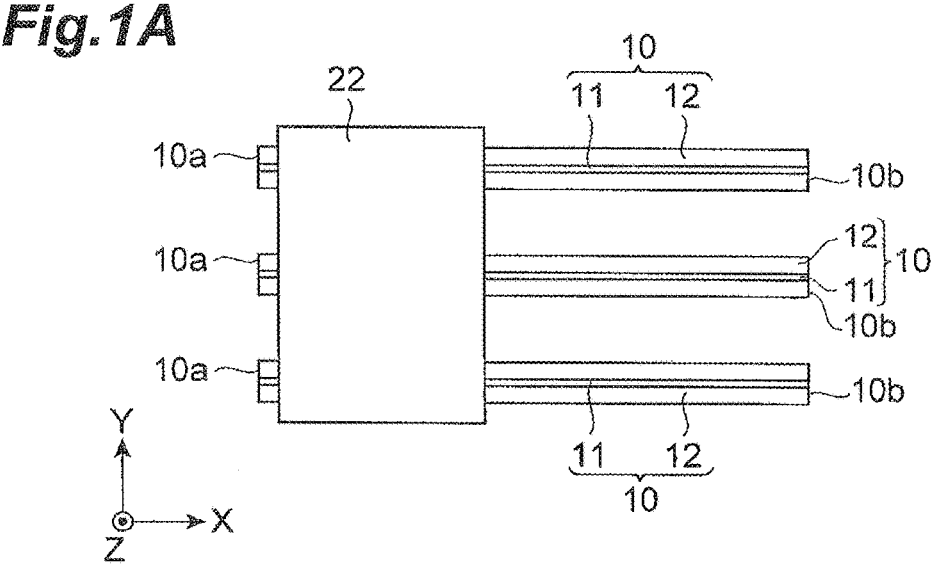
FIGS. 1A and 1B are drawings for explaining the step of preparing optical fibers 10 (pre-step), as one step of the bent optical fiber manufacturing method according to the embodiment of the invention.

Description of Aspects of Embodiment of Invention

Aspects of the embodiment of the invention will be first described as enumerated below.

(1) The bent optical fiber manufacturing method according to the embodiment of the invention, as a first aspect, comprises the pre-step, the bend portion forming step, and the laser light irradiating step. The pre-step is a step of preparing an optical fiber comprised of silica-based glass. The bend portion forming step is a step of bending a partial region of the prepared optical fiber, thereby to form a bend portion in the optical fiber. The laser light irradiating step is a step of heating the bend portion by irradiation with laser light to soften the bend portion formed in the bend portion forming step, thereby to relax a bend in the bend portion (2) As a second aspect applicable to the foregoing first aspect, preferably, the laser light irradiating step comprises setting an irradiation time per irradiation with the laser light and an output power of the laser light so that a change of an optical transmission loss of the optical fiber after the laser light irradiating step from a transmission loss of the optical fiber before the bend portion forming step is not more than a predetermined value.

(3) As a third aspect applicable to at least either one of the first and second aspects, the bend portion forming step may comprise forming a plurality of bend portions (including at least the bend portion formed in the bend portion forming step in the above first aspect) in a plurality of respective regions separated from each other along an axial direction of the optical fiber. In this case, the laser light irradiating step comprises heating each of the bend portions by irradiation with the laser light. This heating softens each of the bend portions formed in the bend portion forming step, so as to relax bends in the respective bend portions.

(4) As a fourth aspect applicable to at least any one of the first to third aspects, preferably, the laser light irradiating step comprises irradiating the bend portion with such laser light that a power of light at wavelengths of not less than 1.06 μm is not less than half of an overall power.

(5) As a fifth aspect applicable to at least any one of the first to fourth aspects, the pre-step may comprise preparing a plurality of optical fibers (including at least the optical fiber prepared in the pre-step in the first aspect) arranged in parallel in a predetermined direction. In the fifth aspect, the bend portion forming step comprises bending the plurality of prepared optical fibers all at one time to form a plurality of bend portions (including at least the bend portion formed in the bend portion forming step in the first aspect) in the plurality of respective optical fibers. Furthermore, the laser light irradiating step comprises setting the laser light so as to have a non-circular beam cross section elongated in the predetermined direction. In addition, the laser light irradiating step comprises heating each of the bend portions of the respective optical fibers by one-time irradiation with the laser light having the non-circular beam cross section. This heating softens each of the bend portions of the respective optical fibers formed in the bend portion forming step, so as to relax bends in the respective bend portions of the optical fibers.

(6) As a sixth aspect applicable to at least any one of the first to fifth aspects, the pre-step may comprise preparing a plurality of optical fibers (including at least the optical fiber prepared in the pre-step in the first aspect) arranged in parallel in a predetermined direction. In the sixth aspect, the bend portion forming step comprises bending the plurality of prepared optical fibers all at one time to form a plurality of bend portions (including at least the bend portion formed in the bend portion forming step in the first aspect) in the plurality of respective optical fibers. Furthermore, the laser light irradiating step comprises heating each of the bend portions of the respective optical fibers while scanning an irradiation position with the laser light relative to the bend portions of the optical fibers formed in the bend portion forming step, along the predetermined direction by a laser light scanning mechanism. This heating softens each of the bend portions of the respective optical fibers, so as to relax bends in the respective bend portions of the optical fibers.

(7) As a seventh aspect applicable to at least any one of the first to sixth aspects, the pre-step may comprise preparing a plurality of optical fibers (including at least the optical fiber prepared in the pre-step in the first aspect) arranged in parallel in a predetermined direction. In the seventh aspect, the bend portion forming step comprises bending the plurality of prepared optical fibers all at one time to form a plurality of bend portions (including at least the bend portion formed in the bend portion forming step in the first aspect) in the plurality of respective optical fibers. Furthermore, the laser light irradiating step comprises heating each of the bend portions of the respective optical fibers while scanning an irradiation position with the laser light relative to the bend portions of the optical fibers formed in the bend portion forming step, along the predetermined direction by an optical fiber moving mechanism. This heating softens each of the bend portions of the respective optical fibers, so as to relax bends in the respective bend portions of the optical fibers.

Details of Embodiment of Invention

The embodiment of the present invention will be described below in detail with reference to the accompanying drawings. The same elements will be denoted by the same reference signs in the description of the drawings, without redundant description. It should be noted that the present invention is by no means intended to be limited to the below-described examples presented by way of illustration but is intended for inclusion of all changes within the meaning and scope of equivalence to the scope of claims, as described in the scope of claims.

Figure 1B:
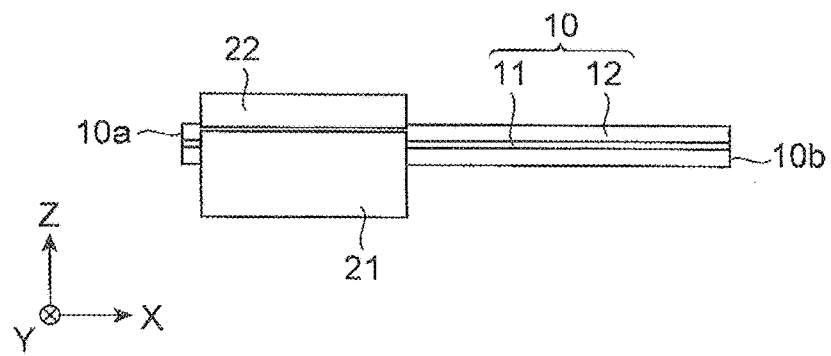

In the bent optical fiber manufacturing method according to the present embodiment, first, an optical fiber 10 to be given a bend portion is prepared. FIGS. 1A and 1B are drawings for explaining the step of preparing the optical fiber 10 (pre-step), as a step of the bent optical fiber manufacturing method according to the present embodiment. FIG. 1A is a top plan view and FIG. 1B a side view. The optical fiber 10 is comprised of silica-based glass and has a core 11 and a cladding 12. The optical fiber 10 may be one optical fiber or a plurality of optical fibers arranged in parallel. The optical fiber 10 may be a single-core fiber or a multi-core fiber. A resin coating layer is removed from a region where the bend portion is to be formed in the optical fiber 10, but the other region may be covered by the resin coating layer. A connection component such as an optical connector may be provided at the tip of the optical fiber 10. In the example shown in FIGS. 1A and 1B, three optical fibers 10 arranged in parallel are fixed on the first end 10a side in respective grooves of a V-grooved substrate 21 and a glass cover 22 for protection is placed on these optical fibers 10.

Figure 2A:
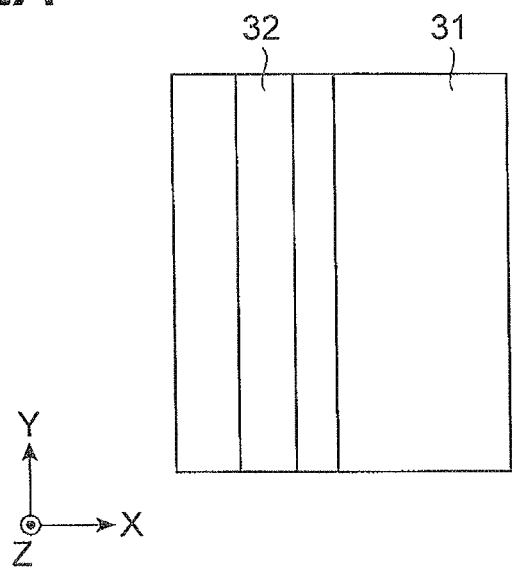
FIGS. 2A and 2B are drawings for explaining a step of preparing a rotary plate 31 and a fixing jig 32, as one step of the bent optical fiber manufacturing method according to the embodiment of the invention.
Figure 2B:
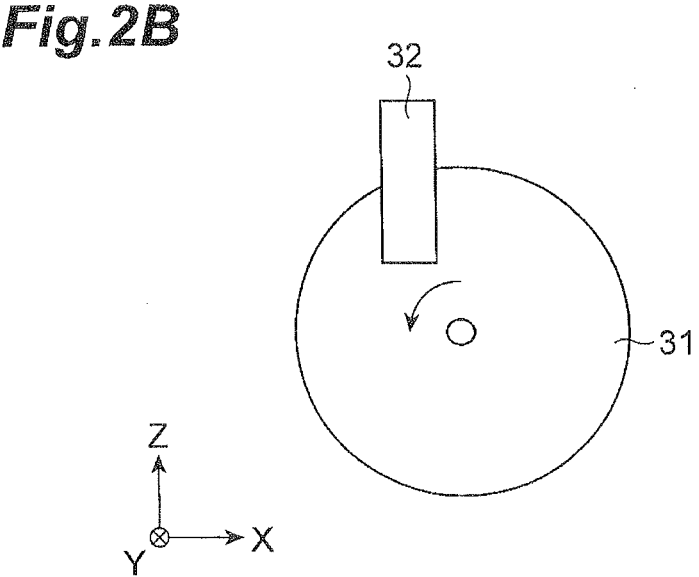

In the bent optical fiber manufacturing method of the present embodiment, a rotary plate 31 and a fixing jig 32 are prepared. FIGS. 2A and 2B are drawings for explaining the step of preparing the rotary plate 31 and the fixing jig 32 in the bent optical fiber manufacturing method of the present embodiment. FIG. 2A is a top plan view and FIG. 2B a side view. The rotary plate 31 is rotatable around a central axis thereof. The fixing jig 32 is attached to the rotary plate 31 and configured to rotate together with the rotary plate 31 along a direction of an arrow in FIG. 2B. The fixing jig 32 can fix the V-grooved substrate 21 shown in FIGS. 1A and 1B.

Figure 3A:
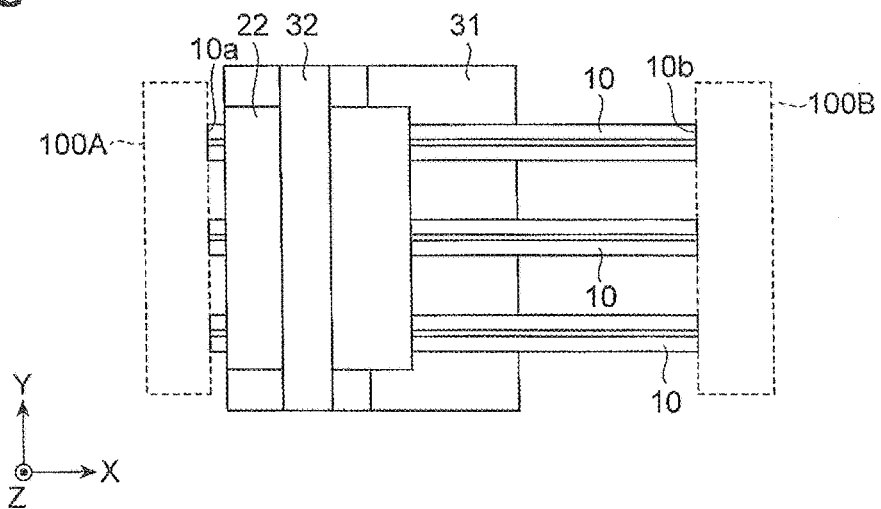
FIGS. 3A and 3B are drawings for explaining a step of fixing a V-grooved substrate 21 to the fixing jig 32, as one step of the bent optical fiber manufacturing method according to the embodiment of the invention.
Figure 3B:
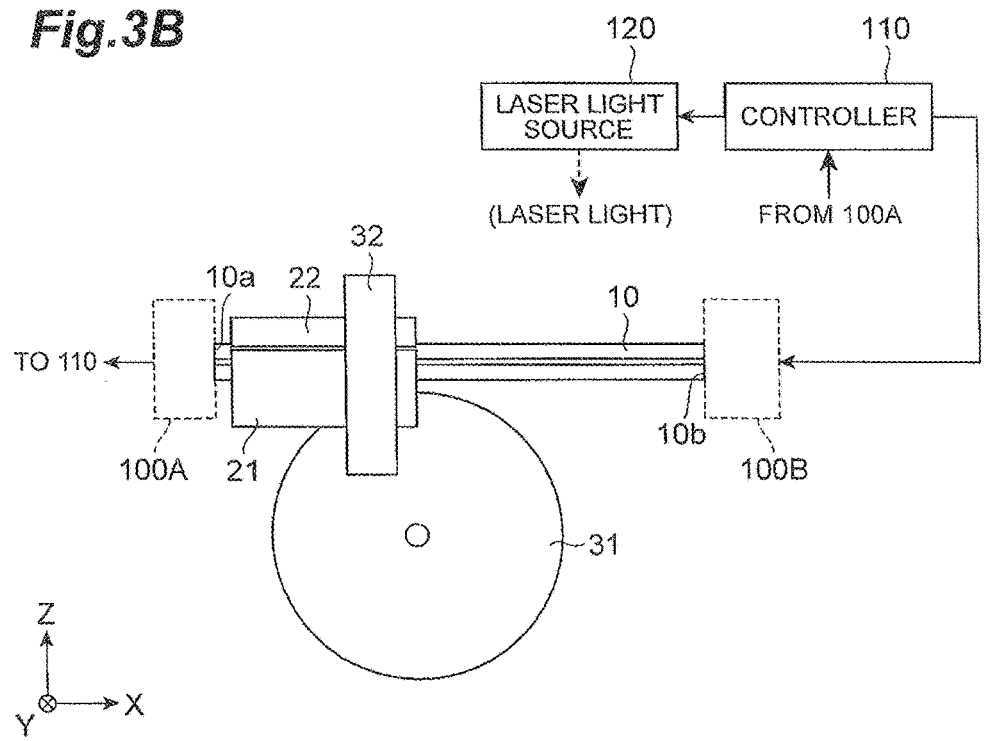

FIGS. 3A and 3B are drawings for explaining the step of fixing the V-grooved substrate 21 to the fixing jig 32, as a step of the bent optical fiber manufacturing method of the present embodiment. FIG. 3A is a top plan view and FIG. 3B a side view. In a state in which the V-grooved substrate 21 is fixed to the fixing jig 32, the three optical fibers 10 arranged in parallel extend in a direction perpendicular to the central axis of the rotary plate 31 and are kept at a fixed distance from the central axis of the rotary plate 31. The distance is set to be equal to the radius of curvature of bend portions to be formed in the respective optical fibers 10 and is the sum of the distance between the outer peripheral surface of the rotary plate 31 and the optical fibers 10 and the radius of the rotary plate 31. There is a gap provided between the outer peripheral surface of the rotary plate 31 and the optical fibers 10, which can avoid damage to the optical fibers 10 and prevent breakage of the optical fibers 10. On the second end 10b side opposite to the first end 10a side of the optical fibers 10 fixed to the fixing jig 32, the optical fibers 10 are held horizontal with no tension in the axial direction.

As shown in FIGS. 3A and 3B, a photodetector 100A is connected to the first ends 10a and a light source 100B is connected to the second ends 10b, for measuring optical transmission losses of the optical fibers 10 before and after processing (the bend portion forming step and laser light irradiating step) for the optical fibers 10. A control unit 110 controls a laser light source 120 in the laser light irradiating step, for adjusting an irradiation time per irradiation with laser light to be irradiated in the laser light irradiating step and an output power of the laser light, so that a change between transmission losses of the optical fibers 10 before and after the processing is not more than a predetermined value.

Figure 4:
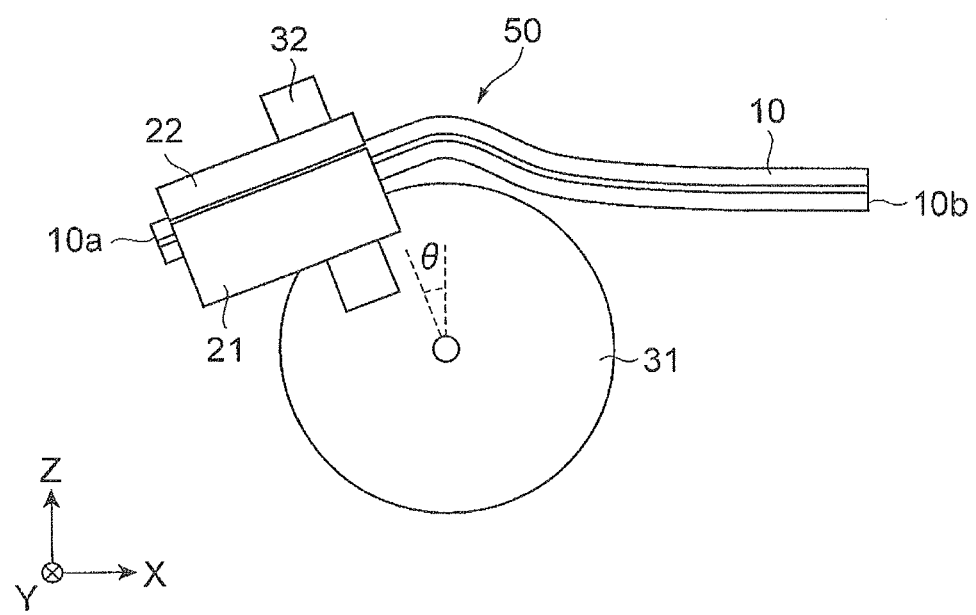
FIG. 4 is a side view for explaining the bend portion forming step of bending partial regions of the optical fibers 10 to form bend portions in the respective optical fibers, as one step of the bent optical fiber manufacturing method according to the embodiment of the invention.

FIG. 4 is a side view for explaining the bend portion forming step, as a step of the bent optical fiber manufacturing method of the present embodiment. In this bend portion forming step, the rotary plate 31 is rotated by a certain angle θ around the central axis thereof, thereby to bend a partial region of each optical fiber 10. As a result, a bend portion 50 is formed in the bent partial region. The optical fibers 10 are held horizontal on the second end 10b side, whereas the fixing position and holding position vary on the first end 10a side of the optical fibers 10 fixed by the fixing jig 32. This operation results in forming the bend portion 50 in the partial region of each optical fiber. On that occasion, a bend in a radius of curvature smaller than an intended desired radius of curvature may be made in the vicinity of the bend position because of the rigidity of the optical fibers 10 in some cases.

Figure 5:
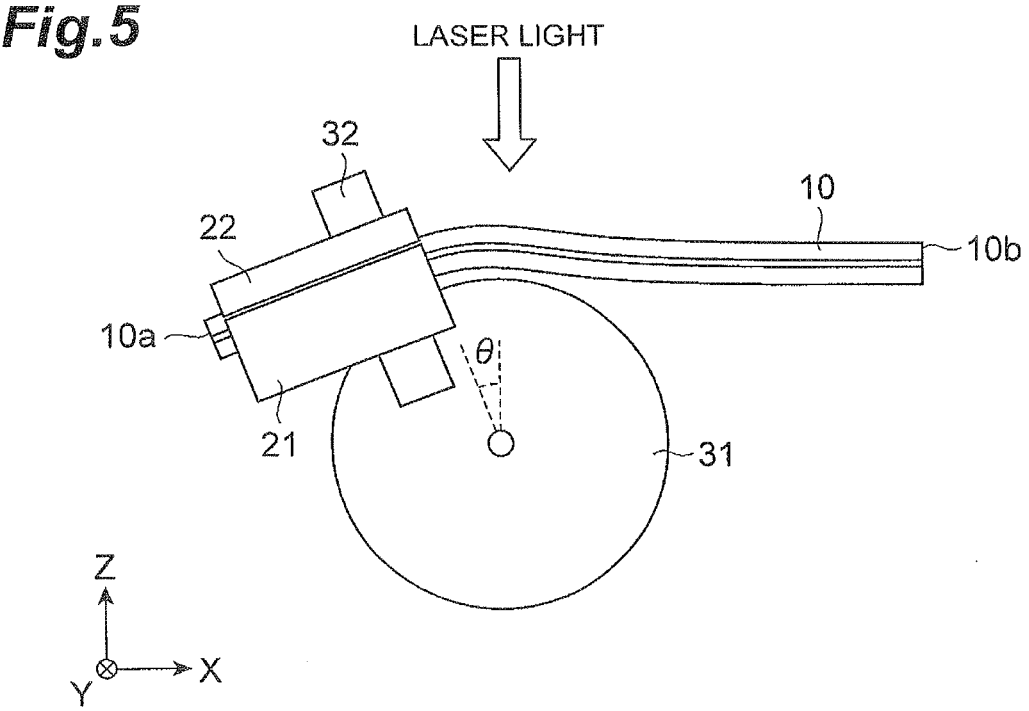
FIG. 5 is a side view for explaining a laser light irradiating step of heating the bend portions by irradiation with laser light to soften the bend portions, thereby to relax bends in the bend portions, as one step of the bent optical fiber manufacturing method according to the embodiment of the invention.

FIG. 5 is a side view for explaining the laser light irradiating step, as a step of the bent optical fiber manufacturing method of the present embodiment. This laser light irradiating step includes heating the bend portions (portions 50 in FIG. 4) by irradiation with laser light to soften the bend portions formed in the bend portion forming step, thereby to relax the bends in the bend portions. This laser light irradiating step makes the radius of curvature of a region (bend region) including the bend portion in each optical fiber 10 closer to the desired radius of curvature. The irradiation with the laser light is terminated after the bends are relaxed. The irradiation time per irradiation with the laser light and the output power of the laser light are preferred to be set so that a change of the optical transmission loss of the optical fiber 10 after the laser light irradiating step from the transmission loss of the optical fiber 10 before the bend portion forming step is not more than a predetermined value. The laser light to be used herein can be laser light of from near infrared to infrared which is capable of heating silica-based glass, and it is preferred that the power of light at the wavelengths of not less than 1.06 μm be not less than half of the overall power. The wavelength of the laser light is preferably in the infrared region of not less than 1.5 μm, more preferably not less than 5 μm. For example, the laser light to be used is infrared CW laser light output from a $CO_2$ laser light source.

Figure 6:
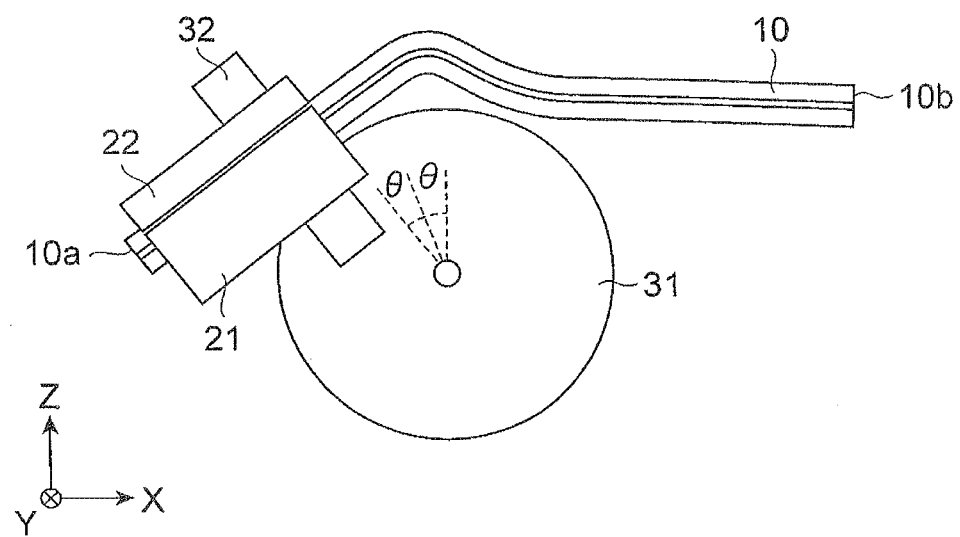
FIG. 6 is a side view for explaining the bend portion forming step subsequent to the laser light irradiating step in FIG. 5.
Figure 7:
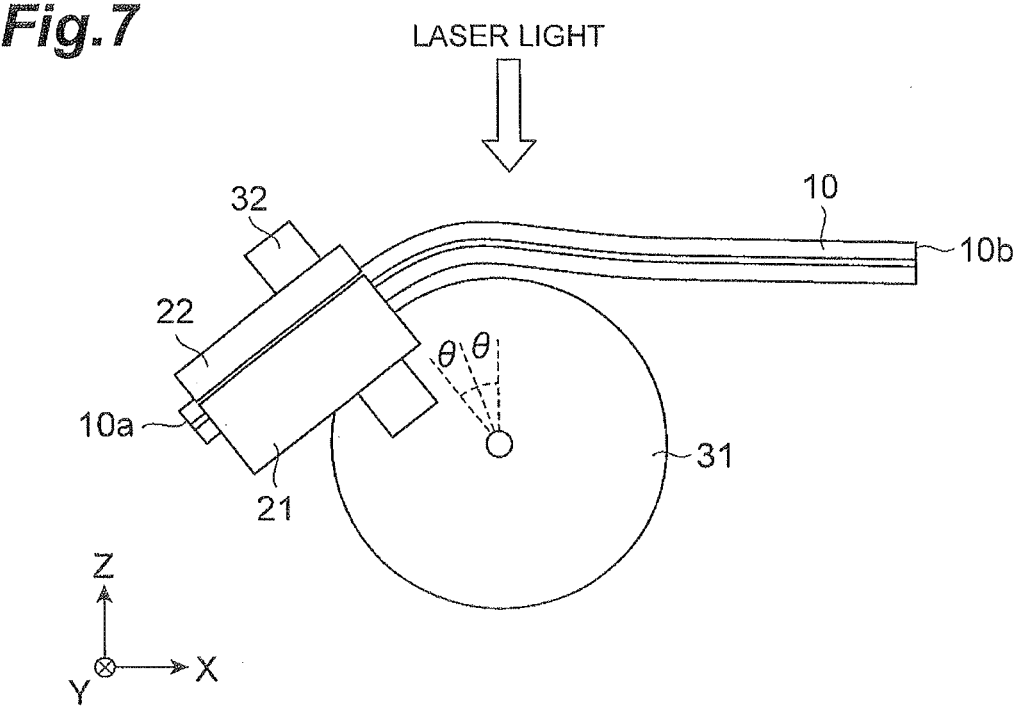
FIG. 7 is a side view for explaining the laser light irradiating step subsequent to the bend portion forming step in FIG. 6.

These bend portion forming step and laser light irradiating step are repetitively carried out. Namely, the bend portion forming steps result in forming the bend portions in respective regions separated in the axial direction of each optical fiber 10 and the laser light irradiating steps result in heating the bend portions by irradiation with the laser light to soften each of the bend portions formed in the bend portion forming steps, thereby to relax bends in the respective bend portions. FIG. 6 is a side view for explaining the bend portion forming step subsequent to the laser light irradiating step in FIG. 5. FIG. 7 is a side view for explaining the laser light irradiating step subsequent to the bend portion forming step in FIG. 6. In this manner, the bend portions are formed by rotating the rotary plate 31 step by step (by the angle θ at a time) and the irradiation processes with the laser light relax the bends in the bend portions. The irradiation with the laser light is suspended during periods in which the optical fibers 10 are bent by rotation of the rotary plate 31. Such discrete irradiation processes with the laser light are favorable because the optical fibers 10 are prevented from being excessively heated. The method can manufacture the bent optical fibers having the respective bend regions (each of which includes one bend portion or a plurality of bend portions) with a desired bend angle and radius of curvature as a whole and having the optical transmission loss within a permissible range eventually.

It is preferred that, as in the present embodiment, the bend portion forming step be configured to bend the plurality of optical fibers arranged in parallel in the predetermined direction, all at one time to form the bend portions in the respective optical fibers. In this case, it is preferred that the laser light irradiating step be configured to irradiate each of the bend portions of the respective optical fibers with the laser light in one of the modes as described below. This makes it feasible to efficiently manufacture a plurality of bent optical fibers.

The first mode of the laser light irradiating step is to irradiate the bend portions of the respective optical fibers all at one time with a beam of linear laser light having a non-circular beam cross section elongated in a predetermined direction (the parallel arrangement direction of the optical fibers). In this first mode, the bend portions of the respective optical fibers are heated by irradiation with the laser light having such a non-circular beam cross section, to soften each of the bend portions of the respective optical fibers, thereby to relax the bends in the respective bend portions of the optical fibers. The second mode of the laser light irradiating step is to scan the irradiation position with the laser light relative to each of the bend portions of the respective optical fibers along the predetermined direction by a laser light scanning mechanism (e.g., a Galvano scanner, a polygon mirror, or the like). This scanning of the irradiation position with the laser light results in heating each of the bend portions of the optical fibers to soften each of the bend portions of the optical fibers, thereby to relax the bends in the respective bend portions of the optical fibers. The third mode of the laser light irradiating step may be a mode to scan the irradiation position with the laser light relative to each of the bend portions of the optical fibers along the predetermined direction by an optical fiber moving mechanism (e.g., a step motor or the like). This scanning of the irradiation position with the laser light results in heating each of the bend portions of the optical fibers to soften each of the bend portions of the optical fibers, thereby to relax the bends in the respective portions of the optical fibers.

Figure 8:
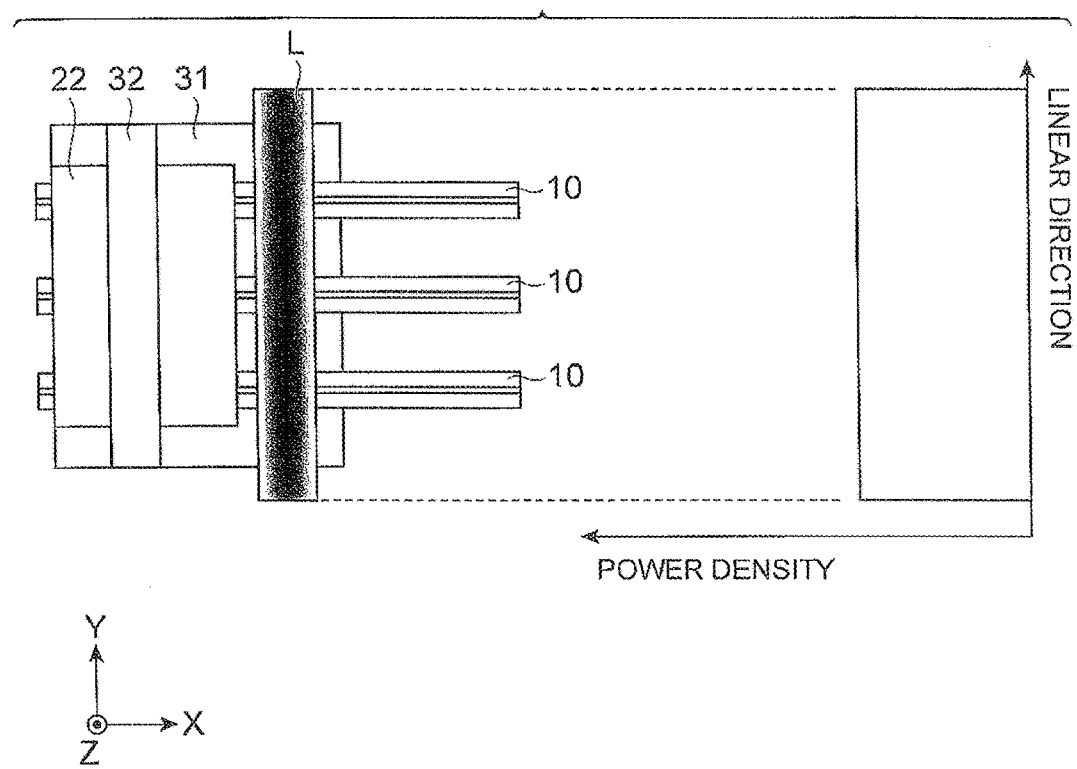
FIG. 8 is a drawing showing a power distribution of the laser light to irradiate the bend portions of multiple optical fibers in the laser light irradiating step.

In the first mode of the laser light irradiating step, as shown in FIG. 8, the linear laser light beam L with the beam cross-sectional shape elongated in the predetermined direction (the parallel arrangement direction of the optical fibers) is desirably set in such a manner that the beam width and power distribution in the direction perpendicular to the predetermined direction (or in the axial direction of the optical fibers) are uniform in the predetermined direction. Relationships among laser light irradiation time, laser light irradiation output, and linear laser light are examined and captured in advance, to suitably implement optimization. When compared to the first mode, the second mode and the third mode can increase the power of the laser light to irradiate the bend portions of the respective optical fibers, and keep the power constant.

Figure 9A:
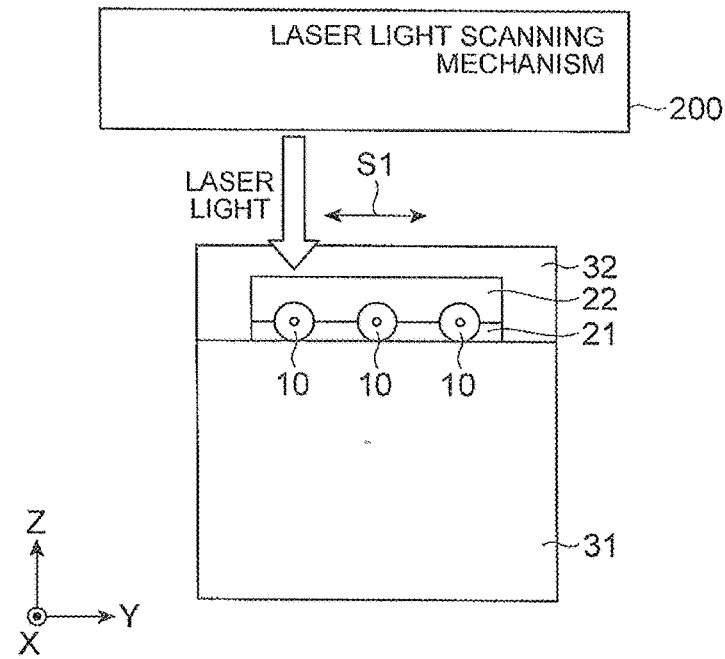
FIG. 9A is a drawing for explaining an operation of a laser light scanning mechanism for carrying out the second mode of the laser light irradiating step.
Figure 9B:
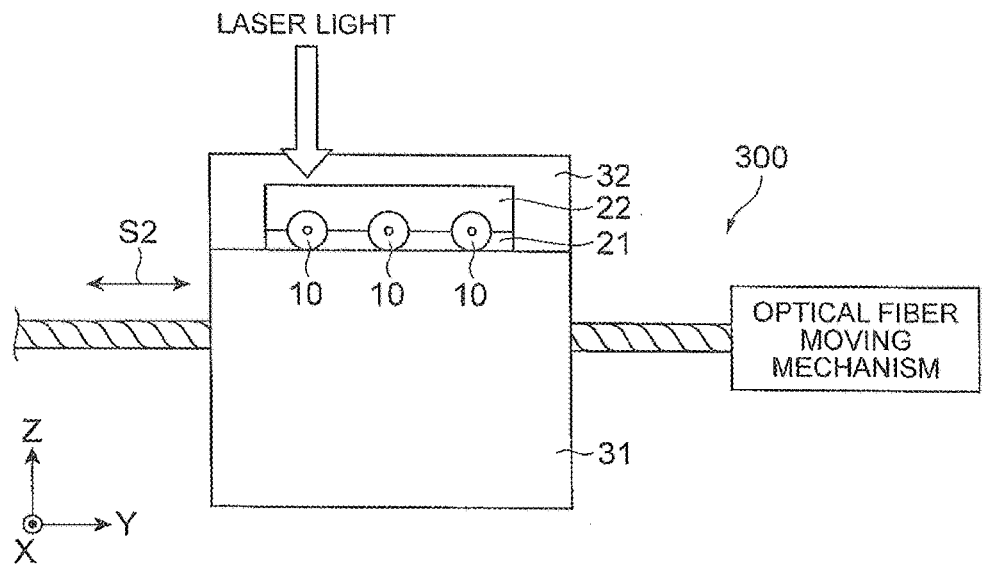
FIG. 9B is a drawing for explaining an operation of an optical fiber moving mechanism for carrying out the third mode of the laser light irradiating step.

FIG. 9A is a drawing for explaining the operation of the laser light scanning mechanism to carry out the second mode of the laser light irradiating step, and FIG. 9B a drawing for explaining the operation of the optical fiber moving mechanism to carry out the third mode of the laser light irradiating step. As shown in FIG. 9A, the laser light scanning mechanism 200 to carry out the second mode scans the laser light irradiation position relative to each of the bend portions of the optical fibers 10 in directions indicated by arrow S1. This operation results in heating each of the bend portions. On the other hand, as shown in FIG. 9B, the optical fiber moving mechanism 300 to carry out the third mode moves the rotary plate 31 per se to which the optical fibers 10 are fixed on the first end 10a side, in directions indicated by arrow S2. This operation results in scanning the irradiation position with the laser light relative to each of the bend portions of the optical fibers 10 in the directions indicated by arrow S2. It results in heating each of the bend portions.

Next, specific examples of the bent optical fiber manufacturing method according to the present embodiment will be described. In the below specific examples, optical fibers were subjected to the processing (including the bend portion forming step and the laser light irradiating step) in accordance with any one of three processing conditions 1 to 3, thereby manufacturing the bent optical fibers.

Figure 10:
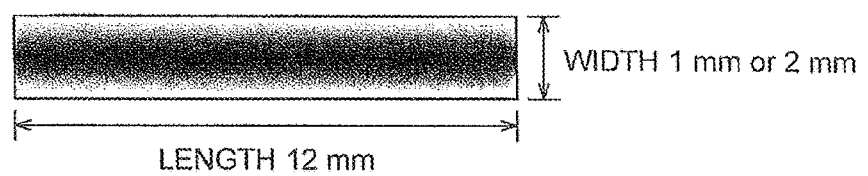
FIG. 10 is a drawing showing a beam cross section of linear laser light.

In each of the processing conditions 1 to 3, prior to the processing, a light source to output light at the wavelength 1.48 μm (corresponding to the light source 100B in FIGS. 3A and 3B) is connected to one end of each optical fiber while a photodetector (corresponding to the photodetector 100A in FIGS. 3A and 3B) is connected to the other end of the optical fiber. With this setup, the optical transmission losses were measured for the optical fibers before and after the processing. The outer diameter of the optical fibers used was 125 μm and the number of optical fiber in each condition was one. The V-grooved member used was a V-grooved substrate of glass "TEMPAX Float" (trademark of SCHOTT AG) with the longitudinal length of 5 mm. The optical fiber was bonded so as to be fixed in a V-groove of this V-grooved member and thereafter was sandwiched between the V-groove and the glass cover. The radius of the rotary plate was 2.5 mm, the distance between the outer periphery of the rotary plate and the optical fiber 0.5 mm, and the radius of rotation 3 mm. In the laser light irradiating step, CW laser light with the wavelength of 10.6 μm was used as laser light output from the $CO_2$ laser light source. This laser light is laser light (linear laser light) having the linear beam cross section with the length of 12 mm, as shown in FIG. 10. The size of the beam cross section (length and width) of such linear laser light was checked by an irradiated mark on an acrylic plate. The radius of curvature as a target was 3 mm and a total bend angle as a target was 82°.

FIG. 11 is a table collectively showing the various conditions in the respective processing conditions 1 to 3 and optical transmission losses in examples. In the processing condition 1, the laser light irradiation count (the number of bend portions) was 8, the average output power of the laser light 30 W, the laser light irradiation time per irradiation step one second, the beam width of the linear laser light 2 mm, and the bend angle per bend step 10° (though the bend angle in the last bend step only was 12°). In the processing condition 2, the laser light irradiation count (the number of bend portions) was 41, the average output power of the laser light 30 W, the laser light irradiation time per irradiation step one second, the beam width of the linear laser light 2 mm, and the bend angle per bend step 2°. In the processing condition 3, the laser light irradiation count (the number of bend portions) was 41, the average output power of the laser light 20 W, the laser light irradiation time per irradiation step one second, the beam width of the linear laser light 1 mm, and the bend angle per bend step 2°.

Figure 12:
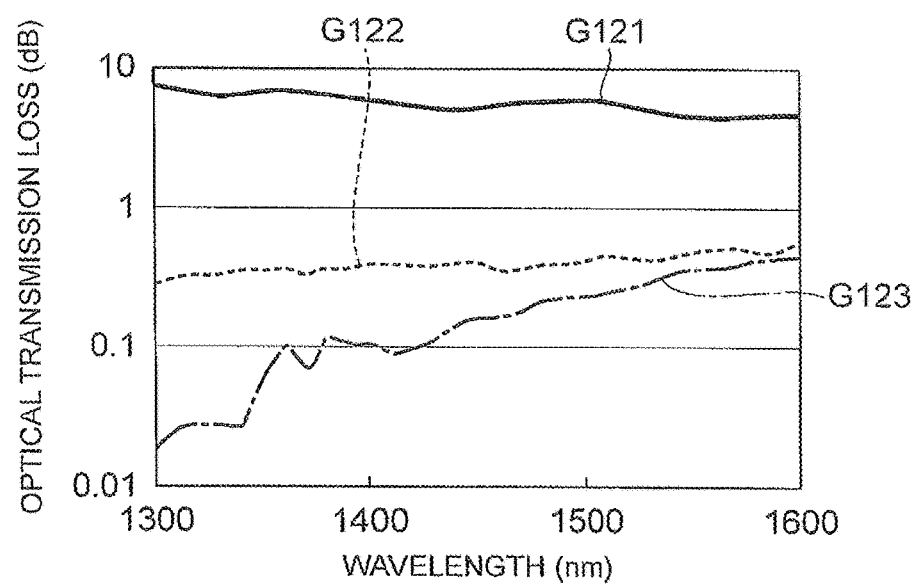
FIG. 12 is optical transmission loss spectra of bent optical fibers manufactured in the respective processing conditions 1 to 3.

As shown in FIG. 11, the optical transmission losses of the manufactured bent optical fibers at the wavelength 1.48 μm were 5.354 dB in the processing condition 1, 0.630 dB in the processing condition 2, and 0.242 dB in the processing condition 3. FIG. 12 shows the optical transmission loss spectra of the bent optical fibers manufactured in the respective manufacturing conditions 1 to 3. In FIG. 12, graph G121 indicates the optical transmission spectrum of the bent optical fiber manufactured in the processing condition 1, graph G122 the optical transmission spectrum of the bent optical fiber manufactured in the processing condition 2, and graph G123 the optical transmission spectrum of the bent optical fiber manufactured in the processing condition 3. Since the bend angle per bend step is large in the processing condition 1, the optical transmission loss is large. In contrast to it, the bend angle per bend step is small in the processing condition 2 and thus the optical transmission loss is small. In the processing condition 3, the bend angle per bend step was the same as in the processing condition 2 but the laser light irradiation width was narrower and the average output power was lower than in the processing condition 2. As a result, it was found that wavelength dependence of optical transmission loss was greater in the processing condition 3 than in the processing condition 2. In the processing condition 3, the optical fiber can be satisfactorily used on the short wavelength side but it is required to achieve further reduction of loss on the long wavelength side.

Figure 13:
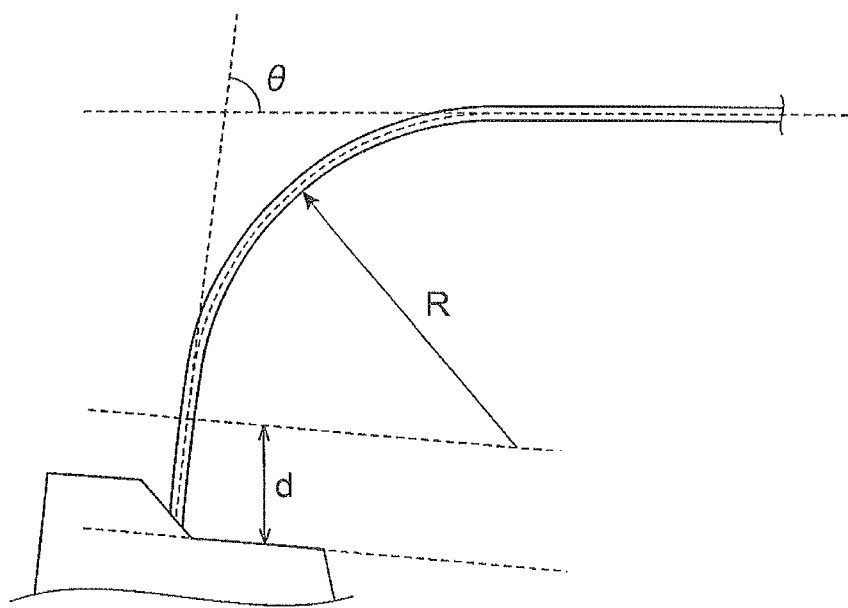
FIG. 13 is a schematic view of a bent optical fiber manufactured in the processing condition 3.

FIG. 13 is a photograph of the bend optical fiber manufactured in the processing condition 3. With this bent optical fiber, there was no laser light irradiated mark, no breakage, or no size reduction recognized. The distance d from the optical connection component end to the bend start position was 1.1 mm. The radius of curvature R of the bent optical fiber manufactured was 2.9 mm, which was approximately equal to the target value of 3 mm. The total bend angle θ of the bent optical fiber manufactured was 82.5°, which was approximately equal to the target value of 82°.

The embodiment of the invention has enabled the manufacture of the bent optical fiber in which the bend portion was formed with the desired radius of curvature, while the optical transmission loss was kept within the permissible range.

What is claimed is:

1. A bent optical fiber manufacturing method for manufacturing a bent optical fiber in which a bend portion is formed at least in a part thereof, the method comprising:
    a pre-step of preparing an optical fiber comprised of silica-based glass;
    a bend portion forming step of bending a partial region of the prepared optical fiber, thereby to form a bend portion in the optical fiber; and
    a laser light irradiating step of heating the bend portion by irradiation with laser light to soften the bend portion formed in the bend portion forming step, thereby to relax a bend in the bend portion,
    wherein the bend portion forming step comprises forming a plurality of bend portions including the bend portion, in a plurality of regions separated from each other along an axial direction of the optical fiber, in the optical fiber, and all of the plurality of bend portions are bent in the same direction with respect to the axial direction of the optical fiber, thereby to form a single bend region having a predetermined radius of curvature as a whole, and
    wherein the laser light irradiating step comprises heating each of the bend portions by irradiation with the laser light to soften each of the bend portions formed in the bend portion forming step, thereby to relax bends in the respective bend portions.

2. The bent optical fiber manufacturing method according to claim 1, wherein the laser light irradiating step comprises setting an irradiation time per irradiation with the laser light and an output power of the laser light so that a change of an optical transmission loss of the optical fiber after the laser light irradiating step from a transmission loss of the optical fiber before the bend portion forming step is not more than a predetermined value.

3. The bent optical fiber manufacturing method according to claim 1, wherein the laser light irradiating step comprises irradiating the bend portion with such laser light that a power of light at wavelengths of not less than 1.06 μm is not less than half of an overall power.

4. The bent optical fiber manufacturing method according to claim 1, wherein the pre-step comprises arranging a plurality of optical fibers including the optical fiber, in parallel in a predetermined direction,
    wherein the bend portion forming step comprises bending the plurality of optical fibers all at one time to form a plurality of bend portions including the bend portion, in the plurality of respective optical fibers,
    wherein the laser light irradiating step comprises setting the laser light so as to have a non-circular beam cross section elongated in the predetermined direction, and
    wherein the laser light irradiating step comprises heating each of the bend portions of the respective optical fibers by one-time irradiation with the laser light having the non-circular beam cross section, to soften each of the bend portions of the respective optical fibers formed in the bend portion forming step, thereby to relax bends in the respective bend portions of the optical fibers.

5. The bent optical fiber manufacturing method according to claim 1, wherein the pre-step comprises arranging a plurality of optical fibers including the optical fiber, in parallel in a predetermined direction,
    wherein the bend portion forming step comprises bending the plurality of optical fibers all at one time to form a plurality of bend portions including the bend portion, in the plurality of respective optical fibers, and
    wherein the laser light irradiating step comprises heating each of the bend portions of the respective optical fibers while scanning an irradiation position with the laser light relative to the bend portions of the optical fibers formed in the bend portion forming step, along the predetermined direction by a laser light scanning mechanism, to soften each of the bend portions of the respective optical fibers, thereby to relax bends in the respective bend portions of the optical fibers.

6. The bent optical fiber manufacturing method according to claim 1, wherein the pre-step comprises arranging a plurality of optical fibers including the optical fiber, in parallel in a predetermined direction,
    wherein the bend portion forming step comprises bending the plurality of optical fibers all at one time to form a plurality of bend portions including the bend portion, in the plurality of respective optical fibers, and
    wherein the laser light irradiating step comprises heating each of the bend portions of the respective optical fibers while scanning an irradiation position with the laser light relative to the bend portions of the optical fibers formed in the bend portion forming step, along the predetermined direction by an optical fiber moving mechanism, to soften each of the bend portions of the respective optical fibers, thereby to relax bends in the respective bend portions of the optical fibers.

* * * * *